July 26, 1960 E. H. BYERLY 2,946,964
SELECTIVE FREQUENCY SYSTEM
Filed March 29, 1957
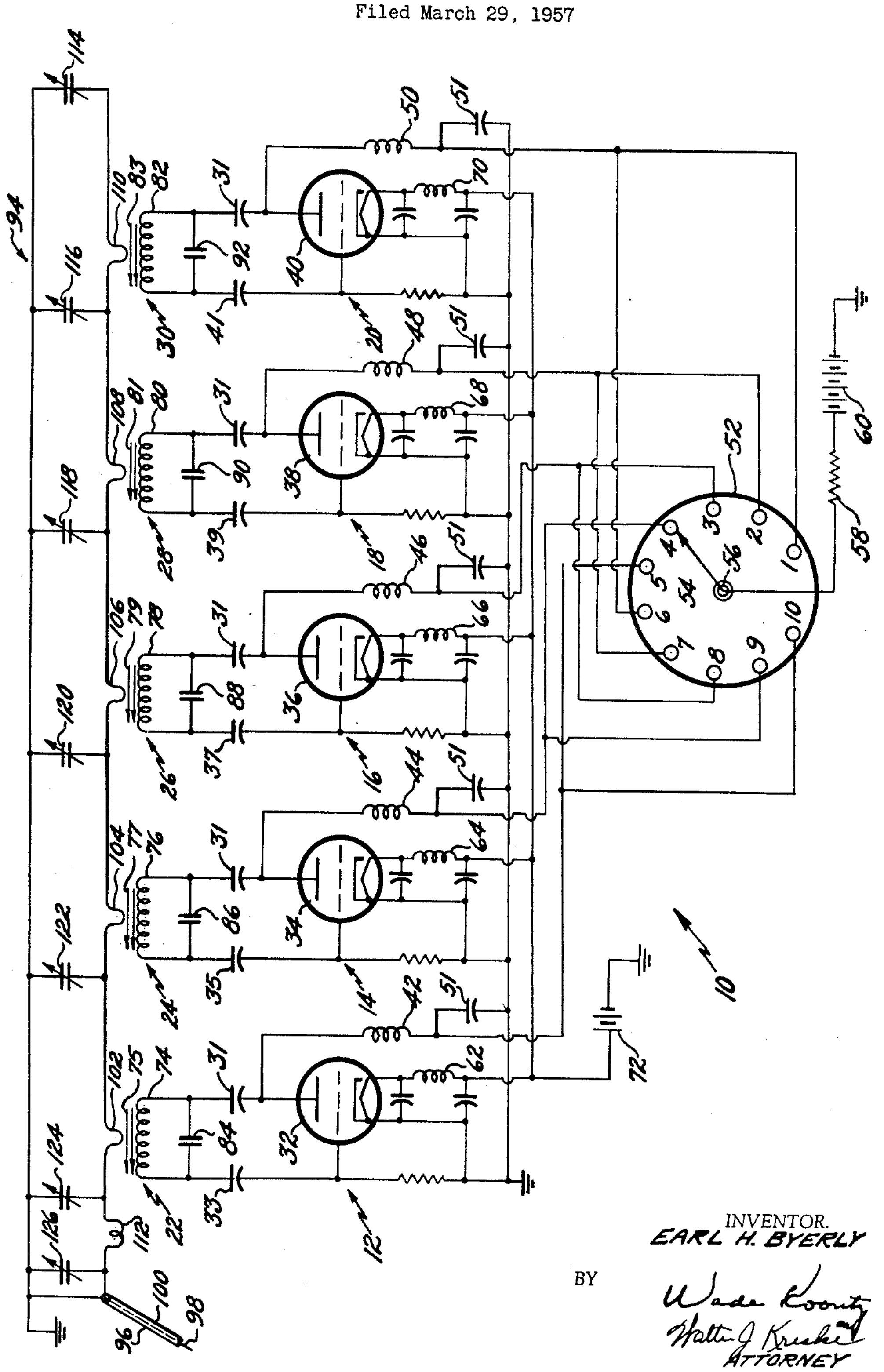
INVENTOR.
EARL H. BYERLY
BY
Wade Koontz
Walter J. Kruhe
ATTORNEY United States Patent Office 2,946,964

Patented July 26, 1960

2,946,964

SELECTIVE FREQUENCY SYSTEM

Earle H. Byerly, Baltimore, Md., assignor to the United States of America as represented by the Secretary of the Air Force Filed Mar. 29, 1957, Ser. No. 649,569

9 Claims. (Cl. 331—49)

This invention relates to electronic oscillators and transmission lines and more particularly to the combination of a multiplicity of oscillators in a single transmission line for selective operation of the oscillators.

In applications requiring the selective use of different signal frequencies it becomes desirable to provide a compact apparatus capable of rapid and easy switching from one frequency to another. This is particularly important in military countermeasures activities where compactness, portability and rapidity of the switching operation are of prime importance. Pursant to the present invention, these and other advantages have been achieved in a system wherein a plurality of oscillators are coupled to a single transmission line with provision for applying a direct current power supply to the desired oscillator for switching to a selected frequency.

Accordingly, a primary object of the present invention is the provision of a system wherein a plurality of oscillators of different frequencies are coupled for operation with a single transmission line.

A further object is the provision of a multiple signal system wherein switching between different frequency signals is rapid and relatively simple.

And another object is the provision of a signalling system wherein a plurality of oscillators of different frequencies may be coupled to a single transmission line and switching between oscillators may be performed by the selective application of a direct current power source to the desired oscillator.

A still further object is the provision of a multi-frequency signalling system capable of operation over a wide range of selective frequencies, and which lends itself to compactness and portability as well as rapid selectivity of a desired frequency.

These features, objects and advantages are achieved generally by providing a multiple frequency signal generating source, an electric signal transmission line and a structure coupling the multiple frequency signal generating source with the transmission line.

By matching the impedance of the coupling structure to the impedance of the transmission line, uniformity of output over the range of frequencies is achieved.

By making the multiple frequency signal source in the form of a plurality of oscillators, each of a selected frequency, with the coupling structure forming part of the tank circuit of the oscillator, switching from one frequency to another is simplified to that of applying the proper voltage across the amplifier tube of the selected oscillator.

By making the coupling circuit in the form of a series of inductances each inductively coupled to the tank circuit of a respective oscillator and a plurality of parallel connected capacitors in circuit with the inductances, facility in matching the coupling circuit to the transmission line for proper operation is achieved.

These and other features, objects and advantages of the invention will become more apparent from the following description taken in connection with the accompanying drawing of a preferred embodiment of the invention and wherein:

The single figure is a schematic representation of a plurality of oscillators coupled to a transmission line in accordance with the present invention.

Referring to the figure in more detail, a selective frequency, electric signal generating system made in accordance with the present invention is designated generally by the numeral 10. The signal generating system 10, in the present instance, has five oscillator circuits 12, 14, 16, 18 and 20. While five oscillator circuits have been used for illustrative purposes in the present instance, a larger or smaller number may also be used where desired. Each of the oscillator circuits 12, 14, 16, 18 and 20 includes an oscillator tank circuit 22, 24, 26, 28 and 30 respectively with one side electrically connected through a capacitor 31 to an anode and the other side through a respective one of capacitors 33, 35, 37, 39 and 41 to the grid of respective amplifier tubes 32, 34, 36, 38 and 40 in the respective oscillator circuit.

The anodes of the amplifier tubes 32, 34, 36, 38 and 40 are also connected through radio frequency choke coils 42, 44, 46, 48, and 50 respectively to switch terminals 5 and 10, 4 and 9, 3 and 8, 2 and 7, and 1 and 6 respectively on the switching wafer 52 and through capacitor 51 in each oscillator circuit to ground. A movable contact arm 54 is mounted to rotate about a pivot 56. The arm 54 is of electrically conductive material and is connected through a resistor 58 to the positive terminal of a direct current power source as a battery 60, the negative terminal of which is connected to ground.

It will be noted that the battery 60 can be connected through the switch arm 54 through either of two terminals to the anode of a selected amplifier tube. For example, the battery 60 can be connected at either of terminals 10 or 5 to the anode of the amplifier tube 32. This construction is used here for simultaneous operation with other equipment (not shown) which might be connected for its power supply to one of the terminals of a pair and not the other. It would thereby give the operator selective use of the signal generator 10 alone or in conjunction with the additional equipment.

The amplifier tubes 32, 34, 36, 38 and 40 have their heater elements connected at one side through radio frequency coils 62, 64, 66, 68, and 70 respectively to the positive terminal of a direct current power source as a battery 72, the negative terminal of which is connected to ground. The other side of each heater element is connected to the respective cathode which is connected to ground.

The tank circuits 22, 24, 26, 28 and 30 include inductive oscillator coils 74, 76, 78, 80 and 82 respectively in parallel with respective capacitors 84, 86, 88, 90 and 92. The windings 74, 76, 78, 80, and 82 preferably have adjustable cores 75, 77, 79, 81 and 83 respectively capable of adjustment of the inductance value of each of the inductive windings over a small range.

A coupling circuit 94 is used to electrically couple the oscillator circuits 12, 14, 16, 18 and 20 to an output line such as a coaxial cable 96 comprising an inner conductor 98 and outer conductor 100. The coupling circuit 94 has series connected inductive windings 102, 104, 106, 108 and 110 coupled inductively to the windings 74, 76, 78, 80 and 82 respectively. The series windings 102, 104, 106, 108 and 110 are connected through an inductive winding 112 to the inner conductor 98 of the coaxial cable 100. The outer conductor 100 of the coaxial cable 96 is connected to ground.

The coupling circuit 94 also includes a plurality of variable capacitors 114, 116, 118, 120, 122, 124, and 126 connected in parallel between the series inductive windings 102, 104, 106, 108, 110 and 112 and ground preferably in such manner that each of the inductive windings is between a pair of adjoining capacitors. The circuit 94 being coupled to the oscillator windings 74, 76, 78, 80 and 82 thereby becomes a part of each of the tank circuits 22, 24, 26, 28 and 30. The coupling circuit 94 is designed preferably with a characteristic impedance matching that of the transmission line 100. The impedance matching operation is facilitated with the use of variable condensers 114, 116, 118, 120, 122, 124, and 126, and adjustable cores 75, 77, 79, 81 and 83.

In the operation of the selective frequency generating system 10, the cores 75, 77, 79, 81 and 83 and variable capacitors 114, 116, 118, 120, 122, 124 and 126 are experimentally adjusted and the system tuned to produce the desired voltage output at the transmission line 100 with the desired frequency in each of the oscillator circuits 12, 14, 16, 18 and 20. The adjustment will preferably be such that the characteristic impedance of the coupling circuit 94 will match that of the coaxial line 100.

Once the proper adjustments have been made, any of the oscillators 12, 14, 16, 18 or 20 may be selected for operation in the system by rotating the switching arm 54 to an appropriate terminal on the switching wafer 52. Thereby B+ voltage from the battery 60 will be supplied to the anode of the appropriate amplifier tube for energizing the corresponding oscillator circuit. For example, the movement of the switch arm 54 to the terminal 5 or 10 energizes the oscillator 12, terminal 9 or 5 energizes the oscillator 14, etc. In this manner, switching from one oscillator to another is merely a matter of rotating the switching arm 54 to the appropriate terminal.

By way of further example, suitable specific circuit element values for operation with a fifty ohm transmission line 100 over a range of frequencies from 180 to 270 megacycles, include capacitors 114, 116, 118, 120, 122, 124, and 126, each being variable between 1.5 to 15 micro-microfarads, and inductive windings 102, 104, 106, 108 and 110 having a one half turn inductively coupled to inductive windings 74, 76, and 78, 80 and 82. The windings 74, 76 and 78 may be of three turns each of No. 18 wire on a ¼ inch diameter cylindrical tube of insulating material, while the windings 80 and 82 may be of four turns each of No. 18 wire on a ¼ inch diameter cylindrical tube of insulating material. Each of the ¼ inch cylindrical tubes may carry a bar slug or core 75, 77, 79, 81 and 83 respectively making the respective tank circuit adjustable to about 4 megacycles each side of the desired frequency. The radio frequency choke coils 42, 44, 46, 48, 50, 62, 64, 66, 68 and 70 may be of the order of 1.2 micro-henries and the oscillator tubes 32, 34, 36, 38 and 40 may be of the 6J6 or 6BQ7 type. The capacitors 51 may each be 1500 micro-microfarads, capacitor 33 may be 10 micro-microfarads, capacitors 35 and 37 may be 15 micro-microfarads and capacitors 39 and 41 may be 20 micro-microfarads each. This exemplary arrangement was found desirable for frequencies of 270, 250, 230, 205 and 280 megacycles in oscillators 12, 14, 16, 18 and 20 respectively. Other values would of course be needed for other frequencies.

This invention is not limited to the specific details shown or described as equivalents will suggest themselves to those skilled in the art.

What is claimed is:

1. The combination with a plurality of electric signal generating means, said plurality being greater than two, of an electrically conductive means for carrying said signals to a load, means inductively coupled to each of said signal generating means for carrying said signals to said conductive means, capacitive means in said inductively coupled means for balancing impedance of said inductively coupled means a source of energy for said signal generating means, and switch means for disconnecting said energy source from all except a selected one of said signal generating means.

2. The combination with a plurality of electric signal oscillators, said plurality being greater than two, of an electrically conductive means for carrying said signals to a load, means inductively coupled to each of said oscillators for carrying said signals to said conductive means, capacitive means electrically coupled to said inductively coupled means for balancing impedance of said inductively coupled means, a source of energy for selectively energizing said oscillators, and switch means for disconnecting said energy source from all except a selected one of said signal generating means.

3. In combination, multiple frequency electric signal generating means in excess of two, an electric signal transmission line, impedance matching means coupling said signal generating means to said transmission line, a source of energy for said signal generating means, and switch means for disconnecting said energy source from all except a selected one of said signal generating means.

4. In combination, a plurality of electric oscillator circuits of selected frequencies, an electric signal transmission line, impedance matching means coupling said oscillator circuits to said transmission line, and means for applying electric power selectively to said oscillators, said means including a switch having multiple contacts directly connected, electrically, to the respective output leads of said oscillator circuits.

5. A multiple frequency radio signal generator, a plurality of electric oscillator circuits of selected frequencies, an electric signal transmission line, impedance matching means coupling said oscillator circuits to said transmission line, said coupling means forming a part of the tank circuit of each said oscillator circuits, and means for applying electric power selectively to said oscillators, said means including a switch having multiple contacts directly connected, electrically, to the respective output leads of said oscillator circuits.

6. A selective frequency, electric signal generating system comprising a plurality of electric oscillator circuits for selected frequencies, each including an inductive capacitive oscillatory tank circuit and an electron current valve, an electric signal transmission line, impedance matching means coupling said oscillator circuits to said transmission line, said coupling means forming a part of the tank circuit of each of said oscillator circuits, and means for applying electric power selectively across said current valves, said means including a switch having multiple contacts directly connected, electrically, to the respective output leads of said oscillator circuits.

7. A selective frequency, electric signal generating system comprising, a plurality of electric oscillator circuits for selected frequencies, each including an inductive, capacitive oscillatory tank circuit, an electric signal transmission line, an inductive capacitive circuit forming part of the tank circuit of each of said oscillators coupled to said oscillators and transmission line, said last mentioned circuit having an impedance matching the impedance of said transmission line, and means for applying electric power selectively to said oscillators, said means including a switch having multiple contacts directly connected electrically, to the respective output leads of said oscillator circuits.

8. A selective frequency, electric signal generating system comprising a plurality of electric oscillator circuits for selected frequencies, each including an inductive, capacitive oscillatory tank circuit and an electron current valve, an electric signal transmission line, an inductive capacitive coupling circuit in electrical engagement with said transmission line, the inductive portions of said coupling circuit being inductively coupled to the inductive portions of said tank circuits, said coupling circuit having an impedance matching the impedance of said transmission line, and means for preventing application of electric power across more than a single selected one of said current valves.

9. A selective frequency, electric signal generating system comprising a plurality of electric oscillator circuits for selected frequencies, each including an electron current valve having an anode, control grid and an inductive, capacitive oscillating tank circuit coupled to said anode and control grid, an electric signal transmission line, a coupling circuit having series connected inductive windings and parallel connected capacitors straddling said inductive windings, each of said inductive windings being inductively coupled to a corresponding oscillator tank circuit and in electrical engagement with said transmission line, and means for preventing application of electric power across more than a single selected one of said current valves.

References Cited in the file of this patent

UNITED STATES PATENTS

| | | |
|---|---|---|
| 1,985,417 | Koch | Dec. 25, 1934 |
| 2,111,567 | Lowell | Mar. 22, 1938 |
| 2,798,158 | Horowitz | July 2, 1957 |
| 2,840,713 | Wulfsberg | June 24, 1958 |

OTHER REFERENCES

Principles of Radar, MIT Radar School Staff, 1946, McGraw-Hill, page 2–88, 1 page.